United States Patent
Heinisch et al.

(10) Patent No.: US 12,517,007 B2
(45) Date of Patent: Jan. 6, 2026

(54) MEASURING APPARATUS AND METHOD FOR MEASURING A MODULATION TRANSFER FUNCTION OF AN AFOCAL OPTICAL SYSTEM

(71) Applicant: TRIOPTICS GmbH, Wedel (DE)

(72) Inventors: Josef Heinisch, Wedel (DE); Sven Sassning, Wedel (DE); Aiko Ruprecht, Wedel (DE); Gabriel Liske, Wedel (DE)

(73) Assignee: Trioptics GmbH, Wedel (DE)

( * ) Notice: Subject to any disclaimer, the term of this patent is extended or adjusted under 35 U.S.C. 154(b) by 113 days.

(21) Appl. No.: 18/274,851

(22) PCT Filed: Feb. 1, 2022

(86) PCT No.: PCT/EP2022/052276
§ 371 (c)(1),
(2) Date: Jul. 28, 2023

(87) PCT Pub. No.: WO2022/167393
PCT Pub. Date: Aug. 11, 2022

(65) Prior Publication Data
US 2024/0085271 A1      Mar. 14, 2024

(30) Foreign Application Priority Data
Feb. 2, 2021 (DE) .................... 10 2021 102 354.8

(51) Int. Cl.
*G01M 11/02*      (2006.01)
(52) U.S. Cl.
CPC .... *G01M 11/0292* (2013.01); *G01M 11/0207* (2013.01)
(58) Field of Classification Search
CPC .................. G01M 11/0292; G01M 11/0207
See application file for complete search history.

(56) References Cited

U.S. PATENT DOCUMENTS

| | | |
|---|---|---|
| 3,904,294 A | 9/1975 | Gold et al. |
| 5,818,573 A | 10/1998 | Lafferty et al. |
| (Continued) | | |

FOREIGN PATENT DOCUMENTS

| | | | |
|---|---|---|---|
| JP | H1068674 A | | 3/1998 |
| JP | H10142102 A | | 5/1998 |
| JP | H11183326 A | * | 7/1999 |

OTHER PUBLICATIONS

JP-H11183326-A -_translation (Year: 1999).*
Japanese Office Action for Application No. 2023546499 mailed on Nov. 4, 2025.

*Primary Examiner* — Tarifur R Chowdhury
*Assistant Examiner* — Carlos Perez-Guzman
(74) *Attorney, Agent, or Firm* — Muncy, Geissler, Olds & Lowe, P.C.

(57) ABSTRACT

A measuring apparatus for measuring a modulation transfer function (MTF) of an afocal optical system has a receiving device, a light-providing device, a camera, at least one further light-providing device, at least one further camera, and a transmission interface. In an operational state, the light-providing device, the afocal optical system, and the camera are arranged coaxially on or with measurement axes parallel to a measuring axis oriented perpendicularly to the receiving plane. The further light-providing device, the afocal optical system, and the further camera are arranged coaxially on or with measurement axes parallel to an oblique measuring axis oriented obliquely to the measuring axis. An evaluation unit is configured to identify, using at least one camera image, the modulation transfer function of the afocal optical system.

15 Claims, 8 Drawing Sheets

(56) References Cited

U.S. PATENT DOCUMENTS

Figure 1:
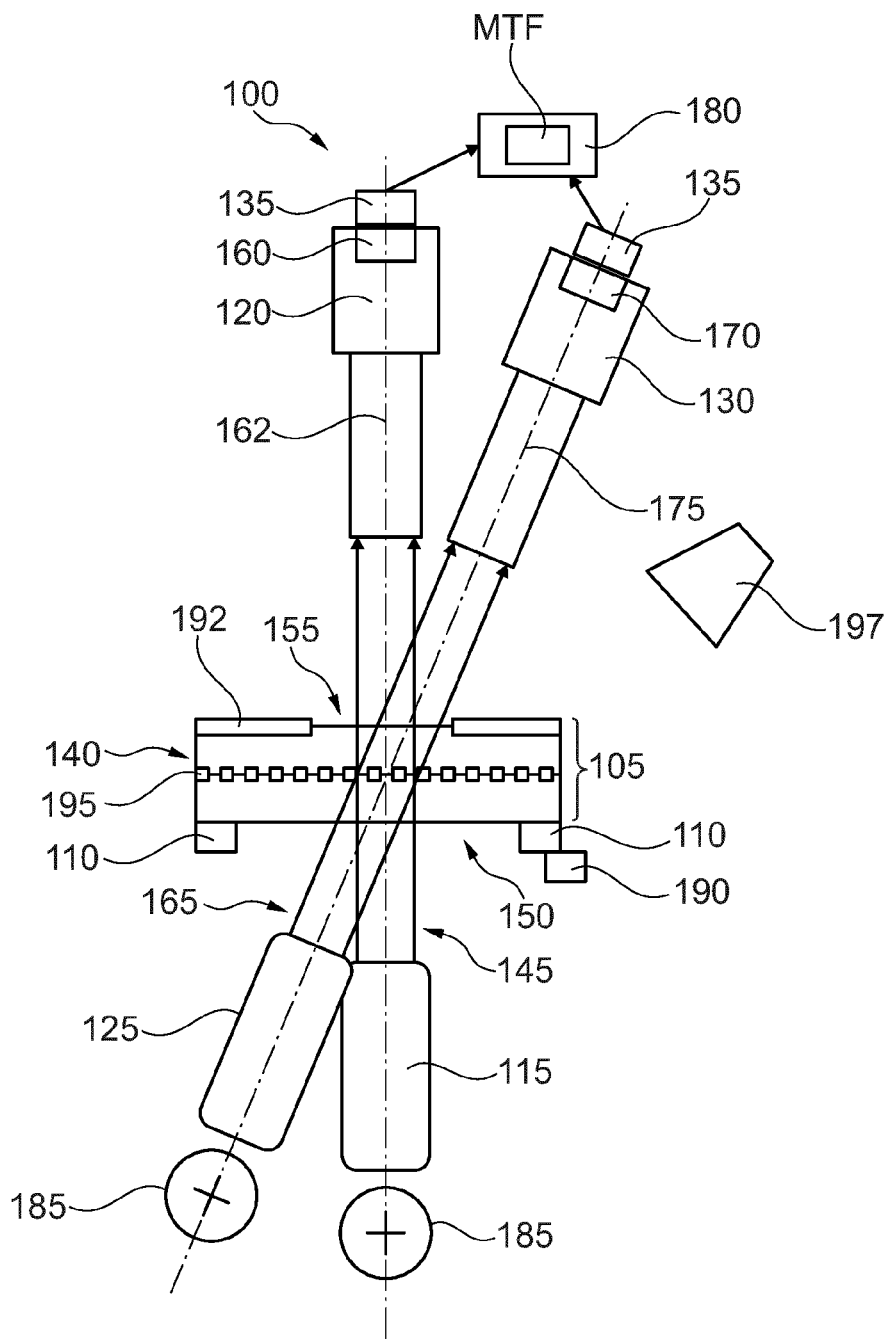

| | | | |
|---|---|---|---|
| 2013/0293726 A1* | 11/2013 | Armstrong-Muntner | ................... G01N 21/958 348/187 |
| 2015/0226636 A1* | 8/2015 | Henry | .................. G01B 11/255 356/601 |
| 2017/0006218 A1* | 1/2017 | Naruse | ................... H04N 23/80 |
| 2019/0238830 A1 | 8/2019 | Price et al. | |

* cited by examiner

MEASURING APPARATUS AND METHOD FOR MEASURING A MODULATION TRANSFER FUNCTION OF AN AFOCAL OPTICAL SYSTEM

CROSS REFERENCE TO RELATED APPLICATIONS

This nonprovisional application is a National Stage of International Application No. PCT/EP2022/052276, which was filed on Feb. 1, 2022, and which claims priority to German Patent Application No. 10 2021 102 354.8, which was filed in Germany on Feb. 1, 2021, and which are both herein incorporated by reference.

The present approach relates to a measuring apparatus and a method for measuring a modulation transfer function of an afocal optical system.

US 2019238830 A1 describes an optical test device for testing cameras.

DISCLOSURE OF THE INVENTION

Against this background, a measuring apparatus for measuring a modulation transfer function of an afocal optical system and a method for measuring a modulation transfer function of an afocal optical system according to the main claims are introduced with the present approach. Advantageous embodiments result from the respective dependent claims and the following description.

The advantages that can be achieved with the approach introduced consist in that an afocal optical system can be tested, for example, with regard to its modulation transfer function. As a result, the imaging quality of the afocal optical system can be tested.

A measuring apparatus for measuring a modulation transfer function of an afocal optical system has a receiving device, a light-providing device, a camera, at least one further light-providing device, at least one further camera, and a transmission interface. The receiving device is formed for receiving the afocal optical system in a receiving plane. The light-providing device is configured to provide light for illuminating the afocal optical system in the receiving device from a first side. The camera is configured to observe the afocal optical system in the receiving device from a second side opposite the first side and to generate a camera image, wherein, in an operational state of the measuring apparatus, the light-providing device, the afocal optical system, and the camera are arranged coaxially on or with measurement axes parallel to a measuring axis oriented perpendicularly to the receiving plane. The further light-providing device is configured to provide further light for illuminating the afocal optical system in the receiving device from the first side. The further camera is configured to observe the afocal optical system in the receiving device from the second side and to generate a further camera image; wherein, in the operational state, the further light-providing device, the afocal optical system, and the further camera are arranged coaxially on or with measurement axes parallel to an oblique measuring axis oriented obliquely to the measuring axis and/or the receiving plane. The transmission interface is configured to transmit the camera image and the further camera image to an evaluation unit, which is configured to identify, using at least the camera image and/or the further camera image, the modulation transfer function of the afocal optical system.

An afocal optical system is characterized in that, as a whole, it has no collecting or dispersing effect for the light emitted from the optical system. The afocal optical system can be either a single element, such as an exit window for a laser, a haptically-sensitive, transparent viewing window for a smartphone display or an optical filter, or an optical system, composed of several elements, such as a double-sided telecentric camera lens or binoculars. The measuring of the modulation transfer function, or "MTF" for short, which can also be called a modulation transmission function, allows for a conclusion to be drawn about the imaging quality of the optical system. The measuring of the imaging quality of refractive optical systems, such as lenses, using MTF, is sufficiently known from the prior art. The measuring apparatus introduced herein uses the approach of simultaneously measuring the imaging quality of an optical system at several field positions, wherein in particular an afocal optical system as the optical system is measurable using the measuring apparatus. The receiving device of the measuring apparatus can be configured to receive the optical system within the receiving plane at a predefined position or to move the optical system within the receiving plane to the predefined position. The light-providing device can be configured to provide the light as broadband light, and/or the further light-providing device can be configured to provide the further light as broadband further light. The light-providing device and/or the further light-providing device can comprise at least one LED—for example, at least one white-light LED. The measuring axis can be understood as the optical path of the light-providing device through the optical system to the camera. Accordingly, the oblique measuring axis can be understood as the optical path of the further light-providing device through the optical system to the further camera. According to one embodiment, the evaluation unit can be part of the measuring apparatus.

The measuring apparatus can also have at least one third camera for observing the optical system in the receiving device from the second side, which is configured to generate a third camera image and has at least one third light-providing device for providing a third light for illuminating the optical system in the receiving device from the first side, wherein, in the operational state of the measuring apparatus, the third light-providing device, the optical system, and the third camera are arranged coaxially on or with measurement axes parallel to a further oblique measuring axis oriented obliquely to the measuring axis and/or the receiving plane and/or the oblique measuring axis. The MTF of the afocal optical system can thus advantageously be measured at multiple field angles in order to be able to achieve a more detailed result for the MTF. The measuring apparatus can also have any number of additional cameras and associated light-providing devices, which each can be arranged with the optical system on different, additional oblique measuring axes. For example, the measuring apparatus can have a total of nine cameras and nine light-providing devices associated with the cameras. The measuring axis and eight oblique measuring axes can thus be used to measure the MTF of the optical system. All oblique measuring axes can intersect the measuring axis at a common intersection point, which can be arranged, for example, on or in the afocal optical system.

According to one embodiment, the light-providing device can have a focusable or a non-focusable collimator which is configured to provide the light as collimated light. The output of the light can thus be directed in a targeted manner—for example, to the optical system. Accordingly, the further light-providing device can have a focusable or a non-focusable collimator which is configured to provide the further light as collimated further light. The collimator can also have a structure to be imaged—for example, in the form of a reticle. The reticle can, for example, form a crosshair.

The structure/reticle can be arranged between the light-providing device and the optical system. A position of the structure/reticle can be fixed or changeable along the measuring axis. Each collimator can have a separate structure or a reticle of this type.

It is furthermore advantageous if the measuring apparatus according to one embodiment has at least one optical filter which is configured to change light, impinging on the optical filter, with a first wavelength range in order to provide the light with a changed, second wavelength range emerging from the optical filter, and/or which is configured to change light, impinging on the optical filter, with a first polarization in order to provide the light with a changed, second polarization emerging from the optical filter. Such an optical filter makes it possible to adapt the wavelength range or the polarization of the light to an area of application. For example, as an optical filter, a so-called V-Lambda filter can be used if the optical system is a window for a mobile phone display or a waveguide of an "augmented reality" system or a "virtual reality" system, or "AR system" or "VR system" for short. The light can thus be adapted to the human eye to a sensitivity distribution in daylight. A corresponding or other optical filter can also be arranged on the oblique measuring axis. The optical filter can be arranged pivotably and/or rotatably, or also fixedly. The optical filter can be arranged parallel to the receiving plane—for example, between the camera and the receiving device or else between the light-providing device and the receiving device. Additionally or alternatively, the measuring apparatus can have a pivotable and/or rotatable or fixed optical filter arranged in the beam path of the collimator for changing or limiting a wavelength range of the light or for changing or limiting a polarization of the light.

The measuring apparatus can have a camera holding device, which has receiving units for receiving the cameras. Such a camera holding device allows for a common accommodation, for example, of all cameras in fixed positions relative to one another. The camera holding device can be formed in the shape of a spherical shell as a camera ball cup. The camera ball cup can be arranged on an X-axis running perpendicular to the measuring axis and/or on a Y-axis running perpendicular to the measuring axis and perpendicular to the X-axis so as to be linearly movable and/or tiltable about the X-axis and/or the Y-axis. Due to such mobility of the camera ball cup, in an optical system formed as, for example, a waveguide, an eyebox can be measured.

The measuring apparatus can also have a light-providing holding device which has receiving units for receiving the light-providing devices. Such a light-providing holding device allows for a common accommodation, for example, of all light-providing holding devices in fixed positions relative to one another. The light-providing holding device can be formed in the shape of a spherical shell as a light-providing ball cup. The light-providing ball cup can be arranged on an X-axis running perpendicular to the measuring axis and/or on a Y-axis running perpendicular to the measuring axis and perpendicular to the X-axis so as to be linearly movable and/or tiltable about the X-axis and/or the Y-axis. Due to such mobility of the light-providing ball cup, in an optical system formed as, for example, a waveguide, an eyebox can be measured. According to one advantageous embodiment, the camera ball cup and the receiving device are fixed, and the light-providing ball cup is linearly movable and/or tiltable. According to one alternative embodiment, the light-providing ball cup and the receiving device are fixed, and the camera ball cup is linearly movable and/or tiltable. In other words, the camera holding device can be arranged so as to be tiltable or tilted relative to the light-providing holding device, or the light-providing holding device can be arranged so as to be tiltable or tilted relative to the camera holding device. According to one embodiment, an offset between the light-providing ball cup and the camera ball cup can thus be realized or is realized.

The camera holding device and, additionally or alternatively, the light-providing holding device can be arranged so as to be laterally movable. A lateral offset along the X-axis and/or the Y-axis can thus be achieved. In this case, it is possible to differentiate between the lateral offset of the cameras or the collimators, or of the associated dome, and the lateral offset of the receiving device (test object holder, tray). There are test objects in which, for example, the entrance pupil is very much smaller than the exit pupil. These are, for example, waveguides for AR/VR systems. The test object must therefore be in a fixed position, so that the entrance pupil can be hit. In order to scan the FOV or the eyebox, the camera holder is moved laterally. In addition, a lateral offset of the collimators can be carried out.

For example, the measuring apparatus can further have a movement device which is configured to move the receiving device transversely to the measuring axis. For example, by using the movement device, the receiving device can be movable along an X-axis running perpendicular to the measuring axis and/or along a Y-axis running perpendicular to the measuring axis and perpendicular to the X-axis, and/or can be tiltable about the X-axis and/or the Y-axis. By means of the movement device, the afocal optical system can be moved onto the measuring axis between the camera and the light-providing device and/or to the intersection point of the oblique measuring axis/axes. A tiltable receiving device enables an FOV measurement, i.e., a "field of view" measurement, in optical systems formed as waveguides.

It is furthermore advantageous if the measuring apparatus according to one embodiment has at least one aperture for the light and/or the further light. The aperture can be used to generate an effective pupil. For this purpose, the aperture can be arranged on the receiving device, on the camera, or on the light-providing device.

The measuring apparatus can further have the evaluation unit, which is configured to identify, using the camera image and/or the further camera image, a deviation in the modulation transfer function and to determine, using the deviation, a correction value or a correction matrix for correcting the modulation transfer function for increasing the imaging quality of the optical system.

For example, the evaluation unit can be configured to recognize the deviation in the modulation transfer function from a predetermined, desired modulation transfer function. Such a deviation in the modulation transfer function can be effected, for example, by an internal structuring, such as capacitive sensors for generating a touch-sensitive mobile phone display, in the optical system formed as part of a mobile phone display. The structuring can therefore have negative effects on the image information transmitted by the mobile phone display, which results in a reduction in imaging quality. By using the correction value or the correction matrix, the deviating modulation transfer function can advantageously be corrected, and the imaging quality can thus be increased.

The camera and/or the further camera can have a fixed or an adjustable focus position. The adjustment of the focus position can be realized in that the camera sensor can be moved relative to the collection optics of the camera in the axial direction along its optical axis. Alternatively or additionally, the collection optics of the camera can have a changeable focal length.

According to one further embodiment, the measuring apparatus can have a structure detection camera which is arranged to face the second side and configured to detect a predefined structure on the receiving plane or in a defined region around the receiving plane, wherein the evaluation device is configured to determine, using the detected predefined structure, a lateral position of the optical system. This makes it possible to detect a position of the optical system within the receiving plane in order, for example, to effect, using the movement device, a movement of the optical system onto the measuring axis and/or the intersection point of the oblique measuring axis/axes.

The afocal optical system can be formed as a single element such as an exit window, e.g., for a laser; a display window, e.g., for a mobile phone; a waveguide, e.g., for an AR system; or an optical filter. Alternatively, however, the afocal optical system can also be formed as an optical system composed of several optical elements—for example, as a camera lens or binoculars.

A method for measuring a modulation transfer function of an afocal optical system comprises a step of providing light, a step of providing further light, a step of generating a camera image, a step of generating a further camera image, and a step of identifying. In the step of providing light, light for illuminating the optical system accommodated in a receiving plane of a receiving device is provided from a first side by use of a light-providing device. In the step of providing further light, further light for illuminating the optical system accommodated in the receiving plane of the receiving device is provided from the first side by use of a further light-providing device. In the step of generating a camera image, a camera image of a reticle is generated via the afocal optical system in the receiving device from a second side opposite the first side by use of a camera, wherein the light-providing device, the optical system, and the camera are arranged coaxially on or with measurement axes parallel to a measuring axis oriented perpendicularly to the receiving plane. In the step of generating a further camera image, a further camera image of a further reticle is generated by means of the afocal optical system in the receiving device from the second side by use of a further camera, wherein the further light-providing device, the optical system, and the further camera are arranged coaxially on or with measurement axes parallel to an oblique measuring axis oriented obliquely to the measuring axis and/or the receiving plane. In the step of identifying, the modulation transfer function of the optical system is identified using the camera image and/or the further camera image.

In the step of generating the camera image, the camera image can be generated by the reticle, which is imaged by means of a collimator, the afocal system, and camera optics of the camera. In the step of generating the further camera image, the further camera image can also be generated by the further reticle, which is imaged by means of a collimator, the afocal system, and camera optics of the further camera.

In the step of generating the camera image and/or in the step of generating the further camera image, a sequence of camera images and/or further camera images can be generated in each case. For example, a first intermediate image of the reticle(s) is generated by the collimator, said first intermediate image being changed by the afocal optical system (test object) and subsequently imaged onto the sensor via collection optics of the camera/further camera.

Figure 2:
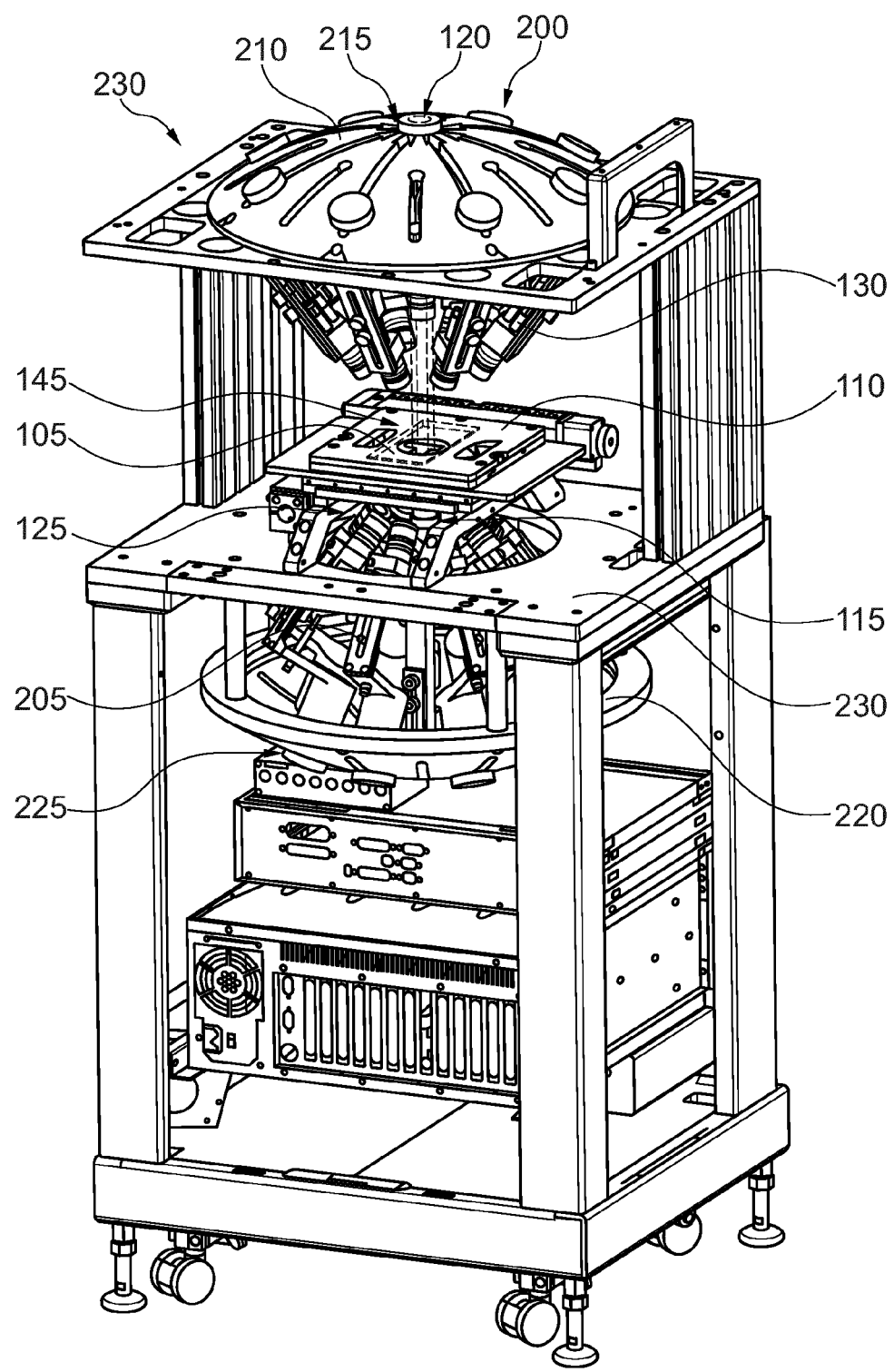
Figure 3:
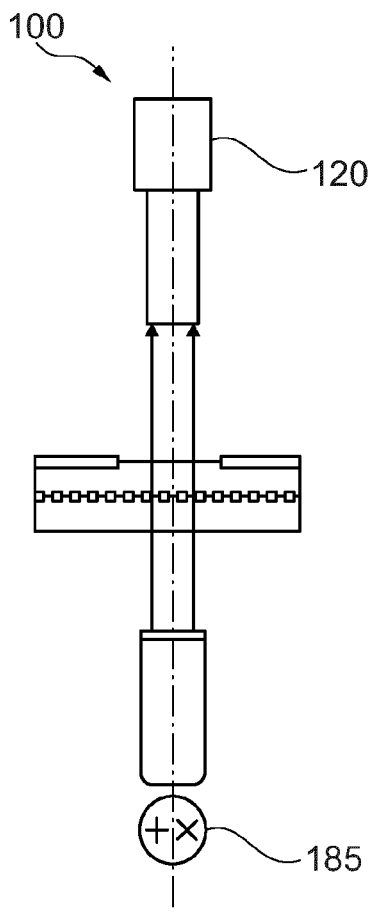
Figure 4:
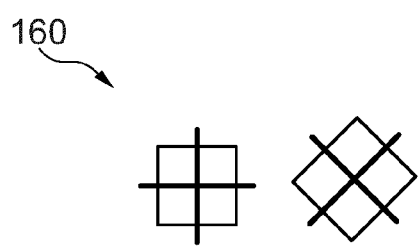
Figure 5:
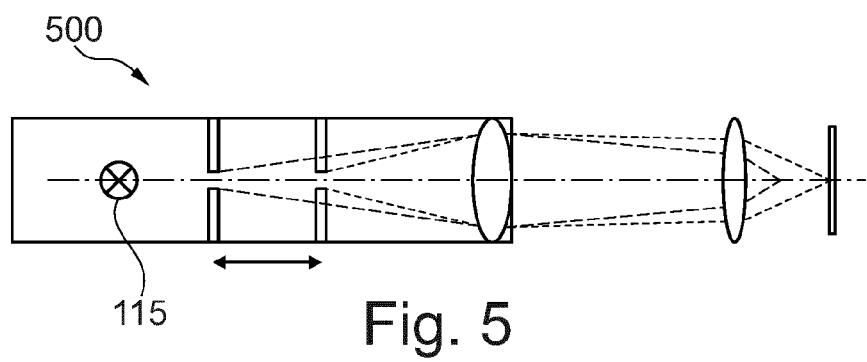
Figure 6:
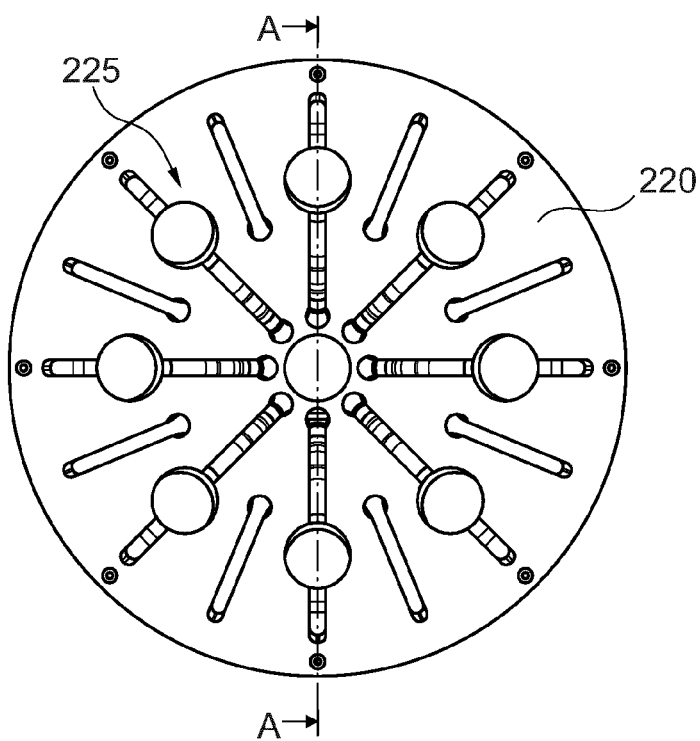
Figure 7:
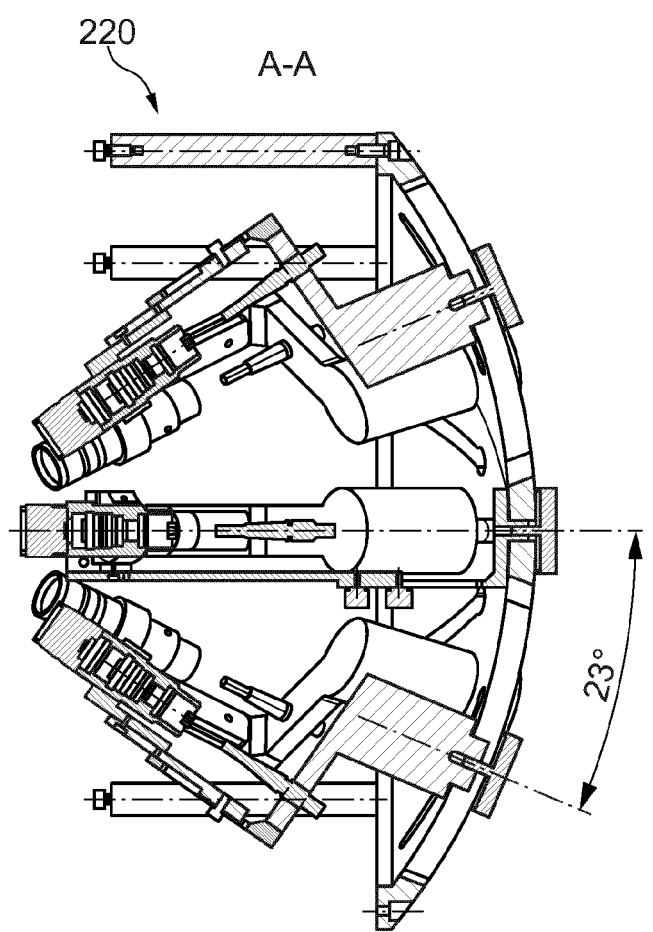
Figure 8:
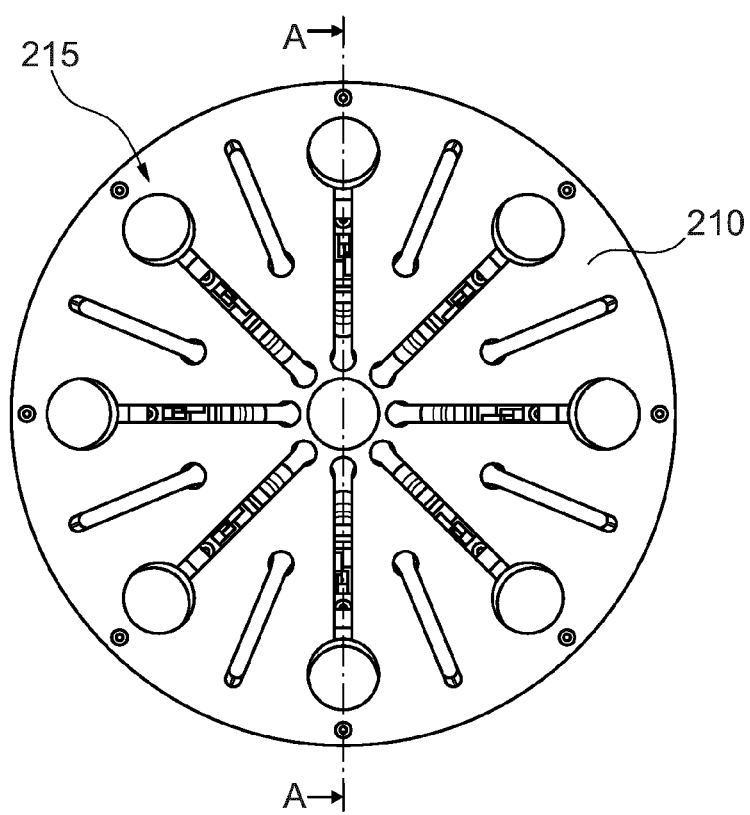
Figure 9:
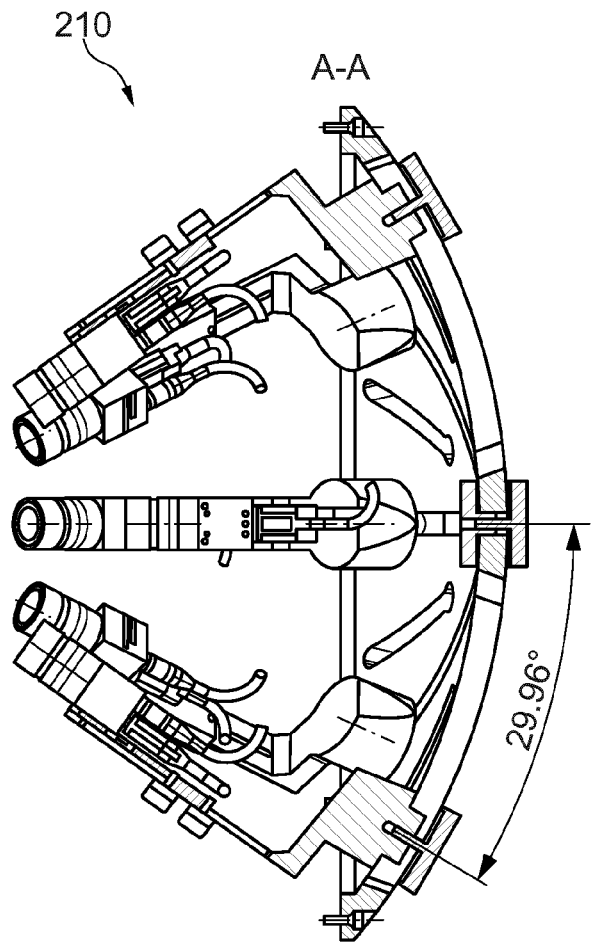
Figure 10:
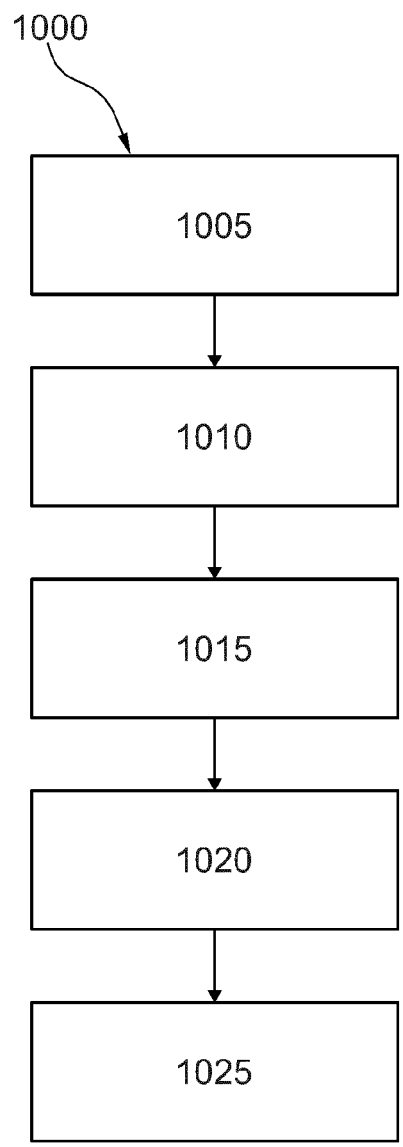

The approach is explained in more detail below by way of example with reference to the accompanying drawings. The following are shown:

FIG. 1 a schematic representation of a measuring apparatus for measuring a modulation transfer function of an afocal optical system according to an exemplary embodiment;

FIG. 2 a perspectival representation of a measuring apparatus according to an exemplary embodiment;

FIG. 3 a schematic representation of a measuring apparatus according to an exemplary embodiment;

FIG. 4 a schematic representation of a camera image of a measuring apparatus according to an exemplary embodiment;

FIG. 5 a schematic, lateral cross-sectional view of a collimator of a measuring apparatus according to an exemplary embodiment;

FIG. 6 a perspective top view of a camera holding device of a measuring apparatus according to an exemplary embodiment;

FIG. 7 a lateral cross-sectional view of a camera holding device of a measuring apparatus according to an exemplary embodiment;

FIG. 8 a perspective top view of a light-providing holding device of a measuring apparatus according to an exemplary embodiment;

FIG. 9 a lateral cross-sectional view of a light-providing holding device of a measuring apparatus according to an exemplary embodiment; and FIG. 10 a flowchart of a method for measuring a modulation transfer function of an afocal optical system according to an exemplary embodiment.

In the following description of advantageous exemplary embodiments of the present approach, the same or similar reference characters are used for the elements that are shown in various figures and function similarly, wherein a repeated description of these elements is dispensed with.

FIG. 1 shows a schematic representation of a measuring apparatus 100 for measuring a modulation transfer function MTF of an afocal optical system 105 according to an exemplary embodiment.

The measuring apparatus 100 has a receiving device 110, a light-providing device 115, a camera 120, at least one further light-providing device 125, at least one further camera 130, and a transmission interface 135. The receiving device 115 is formed to receive the afocal optical system 105 in a receiving plane 140. The light-providing device 115 is configured to provide light 145 for illuminating the afocal optical system 105 in the receiving device 110 from a first side 150. The camera 120 is configured to observe the afocal optical system 105 in the receiving device 110 from a second side 155 opposite the first side 150 and to generate a camera image 160, wherein, in an operational state of the measuring apparatus 100 shown here, the light-providing device 115, the afocal optical system 105, and the camera 120 are arranged coaxially on or with measurement axes parallel to a measuring axis 162 oriented perpendicularly to the receiving plane 140. The further light-providing device 125 is configured to provide further light 165 for illuminating the afocal optical system 105 in the receiving device 110 from the first side 150. The further camera 130 is configured to observe the afocal optical system 105 in the receiving device 110 from the second side 155 and to generate a further camera image 170; wherein, in the operational state, the further light-providing device 125, the afocal optical system 105, and the further camera 130 are arranged coaxially on or with measurement axes parallel to an oblique measuring axis 175 oriented obliquely to the measuring axis 162 and/or obliquely to the receiving plane 140. The transmission interface 135 is configured to transmit the camera image 160 and the further camera image 170 to an evaluation unit 180, which is configured to identify the modulation transfer function MTF of the afocal optical system 105 by use of at least the camera image 160 and/or the further camera image 170.

By way only of example, the afocal optical system 105 according to this exemplary embodiment is accommodated in the receiving device 110 of the measuring apparatus 100, and thus arranged in the receiving plane 140.

According to this exemplary embodiment, the afocal optical system 105 is, by way of example, a single optical element—in this case in the form of a display window for a mobile phone, for example. According to one alternative exemplary embodiment, the afocal optical system 105 is formed as another individual optical element, such as an exit window for a laser, a waveguide for, for example, an AR/VR system, or an optical filter, or else as an optical system composed of several optical elements, such as a double-sided telecentric camera lens or binoculars. According to one exemplary embodiment, the measuring apparatus 100 introduced herein is configured to simultaneously measure the modulation transfer function MTF/imaging quality of the afocal optical system 105 at several field positions. The measuring axis 162 can be understood as the optical path of the light-providing device 115 through the optical system 105 to the camera 120. Accordingly, the oblique measuring axis 175 can be understood as the optical path of the further light-providing device 125 through the optical system 105 to the further camera 130. According to one exemplary embodiment, the evaluation unit 180 is part of the measuring apparatus 100.

According to this exemplary embodiment, the light-providing device 115 has a focusable or a non-focusable collimator which is configured to provide the light 145 as collimated light. Accordingly, the further light-providing device 125 in this exemplary embodiment has a focusable or a non-focusable collimator which is configured to provide the further light 165 as collimated further light. The collimator is shown and described in more detail in FIG. 5. According to this exemplary embodiment, the collimator(s) has/have a structure to be imaged—in this case, for example, in the form of a reticle 185, which in this case forms a crosshair merely by way of example. According to one exemplary embodiment, the reticle 185 is arranged between the light-providing device 115 and the optical system 105. A position of the structure/reticle 185 is fixed or changeable along the measuring axis 162/oblique measuring axis 175. According to one exemplary embodiment, the further light-providing device 125 has a separate further reticle 185.

According to one exemplary embodiment, the measuring apparatus 100 has at least one optical filter which is configured to change light 145, impinging on the optical filter, with a first wavelength range in order to provide the light 145 with a changed, second wavelength range emerging from the optical filter, and/or which is configured to change light 145, impinging on the optical filter, with a first polarization in order to provide the light 145 with a changed, second polarization emerging from the optical filter. Such an optical filter makes it possible to adapt the wavelength range or the polarization of the light to an area of application. According to one exemplary embodiment, a corresponding or other optical filter is also arranged on the oblique measuring axis 175. According to one exemplary embodiment, the optical filter is pivotable and/or rotatable, or else fixedly arranged. According to one exemplary embodiment, the optical filter is arranged parallel to the receiving plane 140, e.g., between the camera 120 and the receiving device 110, or else, according to another exemplary embodiment, between the light-providing device 115 and the receiving device 110. Additionally or alternatively, the measuring apparatus 100 according to one exemplary embodiment has a pivotable and/or rotatable or fixed optical filter arranged in the beam path of the collimator of the light-providing device 115 for changing or limiting a wavelength of the light 145 or for changing or limiting a polarization of the light 145. Additionally or alternatively, the measuring apparatus 100 according to one exemplary embodiment has a pivotable and/or rotatable or fixed optical filter arranged in the beam path of the collimator of the further light-providing device 125 for changing or limiting a wavelength of the further light 165 or for changing or limiting a polarization of the further light 165.

According to one exemplary embodiment, the measuring apparatus 100 also has a movement device 190 which is configured to move the receiving device 110 transversely to the measuring axis 162. By using the movement device 190, the receiving device 110, by way of example, is movable along an X-axis running perpendicular to the measuring axis 162 and/or along a Y-axis running perpendicular to the measuring axis 162 and perpendicular to the X-axis, and/or tiltable about the X-axis and/or the Y-axis. By means of the movement device 190, the optical system 105 according to one exemplary embodiment is movable within the receiving plane 140 on the measuring axis 162 between the camera 120 and the light-providing device 115 and/or on an intersection point of the measuring axis 162 and the oblique measuring axis 175.

According to this exemplary embodiment, the measuring apparatus 100 has at least one aperture 192 for the light 145 and/or the further light 165. According to this exemplary embodiment, the aperture 192 is configured to generate an effective pupil. For this purpose, the aperture 192 according to this exemplary embodiment is arranged on the receiving device 110 or, according to an alternative exemplary embodiment, on or in the camera 120 and/or the further camera 130 or the light-providing device 115 and/or the further light-providing device 125.

According to this exemplary embodiment, the measuring apparatus 100 further has the evaluation unit 180, which is configured to identify a deviation in the modulation transfer function MTF by using the camera image 160 and/or the further camera image 170 and to determine, using the deviation, a correction value or a correction matrix for correcting the modulation transfer function MTF for increasing the imaging quality of the optical system 105. Such a deviation in the modulation transfer function MTF is effected, for example, by an internal structuring 195, such as capacitive sensors for generating a touch-sensitive mobile phone display, in the afocal optical system 105 formed as a mobile phone display window. The structuring 195 can thus cause negative effects on the image information transmitted by the mobile phone display, which results in a reduction in imaging quality. By using the correction value or the correction matrix, the deviating modulation transfer function can, advantageously, be corrected, and the imaging quality can thus be increased. For example, the evaluation unit 180 is configured to identify the deviation in the modulation transfer function MTF from a predetermined, desired modulation transfer function.

According to different exemplary embodiments, the camera 120 and/or the further camera 130 has either a fixed or an adjustable focus position. According to this exemplary embodiment, the camera 120 and/or the further camera 130 has an adjustable focus position in that the image sensor is movable relative to the collection optics of the camera along its optical axis, and/or is in this case formed, for example, in the form of a telescopic camera with a changeable focal length.

According to this exemplary embodiment, the measuring apparatus 100 further has a structure detection camera 197 which is arranged to face the second side 155 and configured to detect a predefined structure on the receiving plane 140 or in a defined region around the receiving plane 140, wherein the evaluation device 180 is configured to determine a lateral position of the optical system 105 by using the detected predefined structure. According to one exemplary embodiment, the movement device 190 is configured to effect a movement of the optical system 105 onto the measuring axis 162 and/or onto the intersection point of the measuring axis 162 and the oblique measuring axis 175 by using the lateral position of the optical system 105.

FIG. 2 shows a schematic representation of a measuring apparatus 100 according to one exemplary embodiment. This can be the measuring apparatus 100 described in FIG. 1, with the difference that the measuring apparatus 100 according to this exemplary embodiment has at least one third camera 200, at least one third light-providing device 205, a camera holding device 210 with receiving units 215 for receiving the cameras 120, 130, 200, and/or a light-providing holding device 220 with receiving units 225 for receiving the light-providing devices 115, 125, 205.

The third camera 200 is configured to observe the optical system 105 in the receiving device 110 from the second side and to generate a third camera image. The third light-providing device 205 is configured to provide a third light for illuminating the optical system 105 in the receiving device 110 from the first side, wherein, in the operational state of the measuring apparatus 100 shown here, the third light-providing device 205, the optical system 105, and the third camera 200 are arranged coaxially on or with measurement axes parallel to a further oblique measuring axis oriented obliquely to the measuring axis and/or the receiving plane and/or the oblique measuring axis. According to one exemplary embodiment, the measuring apparatus 100 has any number of additional cameras and associated light-providing devices, which are each arranged with the optical system 105 on different, additional oblique measuring axes. According to the exemplary embodiment shown here, the measuring apparatus 100 has a total of nine cameras 120, 130, 200 and nine light-providing devices 115, 125, 205 associated with the cameras 120, 130, 200. The measuring axis and eight oblique measuring axes are thus used to measure the MTF of the optical system 105. According to this exemplary embodiment, all oblique measuring axes intersect the measuring axis at a common intersection point, which is arranged, for example, on or in the optical system 105.

According to this exemplary embodiment, the camera holding device 210 is formed in the shape of a spherical shell as a camera ball cup. According to one exemplary embodiment, the camera ball cup is arranged on an X-axis running perpendicular to the measuring axis and/or on a Y-axis running perpendicular to the measuring axis and perpendicular to the X-axis so as to be linearly movable and/or tiltable about the X-axis and/or the Y-axis. According to this exemplary embodiment, the light-providing holding device 220 is formed in the shape of a spherical shell as a light-providing ball cup. According to one exemplary embodiment, the light-providing ball cup is arranged on an X-axis running perpendicular to the measuring axis and/or on a Y-axis running perpendicular to the measuring axis and perpendicular to the X-axis so as to be linearly movable and/or tiltable about the X-axis and/or the Y-axis. According to one alternative exemplary embodiment, the camera ball cup and the receiving device 110 are fixed, and the light-providing ball cup is formed to be linearly movable and/or tiltable. According to one alternative embodiment, the light-providing ball cup and the receiving device 110 are fixed, and the camera ball cup is formed to be linearly movable and/or tiltable.

According to this exemplary embodiment, the camera holding device 210, the light-providing holding device 220, and the receiving device 110 are accommodated in a workbench—in this case, by way of example, in the form of a trolley 230.

FIGS. 1 and 2 show a measuring principle and a structure of the measuring apparatus 100 for afocal optical systems 105 using the example of a structured display. For illustration purposes, the off-axis—with respect to the measuring axis—beam paths are not shown. FIG. 2 shows the technical realization in the completed measuring apparatus. The measuring apparatus 100 makes it possible, as in the case of known measuring systems, to simultaneously measure the imaging quality of optical components—in the following, also referred to as "test objects"—at different field positions, wherein the test objects to be measured are, in contrast to the known measuring systems, afocal optical systems 105. In one application example, the test object is illuminated from the underside with collimated light. This is generated by means of the collimator, which in turn includes a structure to be imaged, e.g., a crosshair—also called a "reticle." FIG. 2 shows a collimator with a fixedly-positioned crosshair. For example, a white-light LED is used as the light source of the light-providing devices 115, 125, 205. Depending upon the application, the use of other light sources is conceivable. According to one exemplary embodiment, optical filters are additionally used to adapt the wavelength range to the application. For example, when measuring mobile phone display windows or waveguides for AR/VR systems, a photopic eye filter is used to adapt the wavelength range of the light 145 to the sensitivity distribution in daylight of the human eye. According to one exemplary embodiment, a fixed or rotatable polarization filter is, additionally or alternatively, arranged in the beam path of the collimator. The insertion of filters is also relevant, for example, in the measurement of the wavelength-dependent imaging quality (MTF).

In order to ensure that the test object can be measured simultaneously at different field positions, the collimators are arranged on the light-providing holding device 220 in the form of a dome, and the cameras 120, 130, 200 are arranged on the camera holding device 210 also in the form of a dome. These domes are shown in more detail in FIGS. 6, 7, 8, and 9. The two dome structures are placed below or above the test object in the operational state of the measuring apparatus 100 shown here. The assembled measuring apparatus 100 is shown here in FIG. 2. Each dome consists of a ball cup, on the surface of which holding devices are fastened. These holding devices in turn are used to fasten the cameras 120, 130, 200 or the collimators. The cameras 120, 130, 200 and the collimators are mounted such that their optical axes intersect at one point. In this case, the camera 120 or the collimator of the light-providing device 115 is mounted in the center of the dome. This axial camera 120 or this axial collimator is oriented such that its optical axis is perpendicular to the test object plane, previously referred to as the receiving plane. The intersection point of all optical axes of the cameras 120, 130, 200 or the collimators is located in this case on the optical axis of the axial camera 120 or of the axial collimator. In the completed measuring apparatus 100, the dome structures are arranged opposite one another. According to one exemplary embodiment, the centers of curvature coincide or, according to another exemplary embodiment, are arranged offset from one another. This may be necessary, for example, if the optical element/system 105 to be tested generates a parallel offset in the beam path. As can be the case, for example, with a planar waveguide or a prismatic system. In addition, an effective pupil is generated in the beam path of the cameras 120, 130, 200. According to one exemplary embodiment, this is realized by means of an aperture in the vicinity of the test object, as shown in FIG. 1 or FIG. 3. According to one alternative exemplary embodiment, an individual aperture is arranged in front of each collimator or in front of each camera 120, 130, 200.

The test object itself is placed in a suitable holder, the receiving device 110, which is located between the upper and the lower domes. The holder can be moved in the x-direction and in the y-direction, so that the test object can be measured at different positions. According to one exemplary embodiment, the holder is designed to receive several test objects, which are measured in succession. Furthermore, according to one exemplary embodiment, an optical filter, which changes the wavelength and/or the polarization of the light beams running through the test object, is arranged above or below the test object. According to one exemplary embodiment, the size of the filter can be adapted as required. This represents an alternative embodiment for the case where collimators are used without corresponding filters.

According to one exemplary embodiment, the struts of the upper dome are equipped with further cameras in the form of the structure detection cameras described in FIG. 1, in order to determine the lateral position (x-, y-position) of the test object. For this purpose, these structure detection cameras are, according to one exemplary embodiment, configured to detect known structures in the test object plane or to detect additional structures which are arranged at a defined distance from the test object and located, for example, on the test object holder.

An important field of application of the measuring apparatus 100 introduced herein is the measurement of mobile phone display windows. These have the special feature of having an internal structuring which, for example, ensures that the displays are touch-sensitive. A section of such a structured display is shown schematically in FIGS. 1 and 3. Such an introduced structure has negative effects on the image information transmitted by the display. According to one exemplary embodiment, the measuring apparatus 100 introduced herein further has the evaluation unit, which makes it possible to determine a reduction in the imaging quality caused by the structuring and to calculate a correction factor or a correction matrix on the basis of this value. The correction factor calculated in this way or the correction matrix calculated in this way is, within the framework of image processing, further applied, in order to correct an image which was recorded through the display with a camera 120, 130, 200. A specific application would be the image recording via the front camera of a smartphone.

A further important field of application of the measuring apparatus 100 introduced herein is the measurement of waveguides—in particular, of such waveguides as are used in VR/AR headsets. In the case of optical systems for VR/AR applications, it is important to measure the region of the so-called "eyebox." This region can generally be defined as a volume in which the pupil of the eye must be located in order to fulfill certain defined criteria with regard to the image perception. Such a criterion may, for example, be that an image generated by the headset remain completely visible in the region of the eyebox. In order to measure a corresponding waveguide at different positions within the eyebox by means of the measuring apparatus 100 proposed here, it is configured in a corresponding variant such that the test object and either the lower or the upper dome are fixed, and the other dome can be changed in its lateral position.

Another important measurement parameter for optics for AR/VR systems is their field angle or field of view (FOV). In this case, it is necessary that the angle between the test object plane and the optical axes of the cameras 120, 130, 200 or the collimators be able to be changed, so that, for example, the angle between the test object plane and the axial camera 120/axial collimator differs from 90°. According to different exemplary embodiments, this is realized either in that the test object holder is tiltable about the x-axis or the y-axis, or that, alternatively, the upper or the lower dome is tiltable.

According to one exemplary embodiment, the following components are main features of the measuring apparatus 100 introduced here for measuring the MTF of afocal optical systems 105:

the receiving device 110 in the form of a test object holder which, according to one exemplary embodiment, is able to move the afocal optical system 105 to be tested into a fixedly defined position;

several cameras 120, 130 arranged above the test object in, for example, a fixed structure such that the image planes of the cameras 120, 130 are distributed on the surface of a ball cup, and that the optical axes of the cameras 120, 130 intersect at least approximately at one point, and that one of the cameras 120 is furthermore arranged in the center of the surface of the ball cup such that the optical axis of the one camera 120 can stand perpendicularly to the test object plane, and that the intersection point of the optical axes of all cameras 120, 130 furthermore lies on the optical axis of the one camera 120;

several light-providing devices 115, 125, e.g., with collimators, which are arranged below the test object in, for example, a fixed structure such that the object planes of the collimators are distributed on the surface of a ball cup, and that the optical axes of the collimators intersect at least approximately at one point, and that one of the collimators is furthermore arranged in the center of the surface of the ball cup such that the optical axis of the one collimator can stand perpendicularly to the test object plane, and that the intersection point of the optical axes of all collimators furthermore lies on the optical axis of the one collimator; and the evaluation unit in the form of a control unit for evaluating the camera images recorded by the cameras 120, 130.

Further optional components or properties of the here introduced measuring apparatus 100 are, in any combination:

that the cameras 120, 130 have either a fixed or an adjustable focus position;

that each collimator/light-providing device 115, 125, 205 has a broadband light source, and/or that fixed or rotatable or pivotable optical filters are furthermore arranged within the beam path of the collimator/light-providing device 115, 125, 205, and/or that the optical filters are used to limit or change the wavelength range and/or the polarization of the light 145 emanating from the light source;

that, in the beam path of each collimator/light-providing device 115, 125, 205, a reticle is located which is illuminated by the light source and whose position along the optical axis in the beam path of the collimator/light-providing device 115, 125, 205 is either fixed or changeable;

that, in a plane which is parallel to the test object, a fixed or rotatable or pivotable optical filter is arranged and used to influence the light beams passing through the test object with respect to their wavelength and/or their polarization;

that an effective pupil is generated in at least one beam passing through the test object, which is realized in the form of at least one physical aperture;

that the test object holder is fixedly connected to the camera holding device 210 in the form of a fixed camera structure located above the test object holder, and that the light-providing holding device 220 in the form of a fixed collimator structure located below the test object holder is changeable in its lateral position relative to the test object holder;

that the test object holder is fixedly connected to the fixed collimator structure located below the test object holder, and that the fixed camera structure located above the test object holder is changeable in its lateral position relative to the test object holder;

that it is possible to change the angle between the test object plane and the optical axes of the cameras 120, 130 within the fixed camera structure, and/or the collimators within the fixed collimator structure;

that at least one structure detection camera is arranged above the test object and used to detect known structures in the test object plane or in a distance defined with respect to the test object plane, and that the control unit is furthermore configured such that a lateral position of the test object is determined based upon the images detected by the at least one structure detection camera;

that the control unit is furthermore configured such that it is able to determine a reduction in the imaging quality caused by a structure in the test object and to furthermore determine a correction factor or a correction matrix, by means of which the previously determined reduction can be computationally compensated for within the framework of image processing.

FIG. 3 shows a schematic representation of a measuring apparatus 100 according to one exemplary embodiment. This can be the measuring apparatus 100 described in FIG. 1 or 2.

FIG. 3 shows the axial beam path of the measuring apparatus 100. The associated axial camera image is shown in FIG. 4. According to one exemplary embodiment, the camera 120 with, for example, an axially-changeable sensor position and/or adjustable focal length is used as an imaging system. Alternatively, it is possible to use a collimator with a movable reticle and a fixedly set camera 120, or also a focusable collimator and a camera 120 adjustable in its focus position.

FIG. 4 shows a schematic representation of a camera image 160 of a measuring apparatus 100 according to one exemplary embodiment. In this case, this can be the camera image 160 of the camera 120 of the measuring apparatus 100 described in FIG. 3, which can also be referred to as an axial camera image.

FIG. 5 is a schematic, lateral cross-sectional view of a collimator 500 of a measuring apparatus according to one exemplary embodiment. In this case, this can be the measuring apparatus 100 described in one of FIGS. 1 through 4. The functional principle of a focusable collimator 500 is shown generally for illustration purposes.

FIG. 6 is a perspective top view of a light-providing holding device 220 of a measuring apparatus according to one exemplary embodiment. In this case, this can be the light-providing holding device 220 described in FIG. 2. The light-providing holding device 220 can also be referred to as a collimator dome. A section line A-A is indicated.

FIG. 7 is a lateral cross-sectional view of a light-providing holding device 220 of a measuring apparatus according to one exemplary embodiment. A section line A-A is shown. It can thus be the light-providing holding device 220 described in FIG. 6, in which collimators described in FIG. 5 are accommodated.

FIG. 8 is a perspective top view of a camera holding device 210 of a measuring apparatus according to one exemplary embodiment. In this case, this can be the camera holding device 210 described in FIG. 2. The camera holding device 210 can also be referred to as telescopic dome. A further section line A-A is indicated.

FIG. 9 is a lateral cross-sectional view of a camera holding device 210 of a measuring apparatus according to one exemplary embodiment. A section line A-A is shown. It can therefore be the camera holding device 210 described in FIG. 8 in which cameras are accommodated.

FIG. 10 shows a flowchart of a method 1000 for measuring a modulation transfer function of an afocal optical system according to one exemplary embodiment. This can be the afocal optical system described in one of the preceding figures. The method 1000 can be controlled or carried out by the measuring apparatus which was described in one of the preceding figures.

The method 1000 comprises a step 1005 of providing light, a step 1010 of providing further light, a step 1015 of generating a camera image, a step 1020 of generating a further camera image, and a step 1025 of identifying. In step 1005 of providing light, light for illuminating the afocal optical system accommodated in a receiving plane of a receiving device is provided from a first side by using a light-providing device. In step 1010 of providing further light, further light for illuminating the afocal optical system accommodated in the receiving plane of the receiving device is provided from the first side by using a further light-providing device. In step 1015 of generating a camera image, a camera image of the reticle is generated via the afocal optical system in the receiving device from a second side opposite the first side by using a camera, wherein the light-providing device, the afocal optical system, and the camera are arranged coaxially on a measuring axis or have parallel measurement axes oriented perpendicularly to the receiving plane. In step 1020 of generating a further camera image, a further camera image of a further reticle is generated via the afocal optical system in the receiving device from the second side by using a further camera, wherein the further light-providing device, the afocal optical system, and the further camera are arranged coaxially on or with measurement axes parallel to an oblique measuring axis oriented obliquely to the measuring axis and/or the receiving plane. In step 1025 of identifying, the modulation transfer function of the afocal optical system is identified or calculated using the camera image and/or the further camera image. Optionally, in the context of this step, a correction factor or a correction matrix can additionally be calculated.

According to one exemplary embodiment, the step 1005 of providing light and the step 1010 of providing further light are carried out simultaneously. According to one exemplary embodiment, the step 1015 of generating a camera image and the step 1020 of generating a further camera image are carried out simultaneously.

In step 1015 of generating, the camera image can be generated by the reticle, which is imaged by means of the collimator, the afocal system, and the camera optics of the camera. In step 1020 of generating, the further camera image can likewise be generated by the further reticle, which is imaged by means of the collimator, the afocal system, and the camera optics of the further camera.

In step 1015 of generating and/or in step 1020 of generating, a sequence of camera images and/or further camera images can be generated. For example, a first intermediate image of the reticle is generated by the collimator, said first intermediate image being changed by the afocal optical system (test object) and subsequently imaged onto the sensor via collection optics of the camera/further camera.

The invention claimed is:

1. A measuring apparatus for measuring a modulation transfer function (MTF) of an afocal optical system, the measuring apparatus comprising:
a receiving device for receiving the afocal optical system in a receiving plane;
a light-providing device having a broad band light source and a cross shaped test structure illuminated by the broad band light source for providing light for illuminating the afocal optical system in the receiving device from a first side;
a camera for observing the afocal optical system in the receiving device from a second side opposite the first side for generating a camera image, wherein, in an operational state of the measuring apparatus, the light-providing device, the afocal optical system, and the camera are arranged coaxially on or with measurement axes parallel to
a measuring axis oriented perpendicularly to the receiving plane;
at least one further light-providing device having a further broad band light source and a further cross shaped test structure illuminated by the further broad band light source for providing further light for illuminating the afocal optical system in the receiving device from the first side, wherein the light-providing device and the further light-providing device are configured for simultaneously providing light as well as providing further light for illuminating the afocal optical system;
at least one further camera for observing the afocal optical system in the receiving device from the second side for generating a further camera image; wherein, in the operational state, the further light-providing device, the afocal optical system, and the further camera are arranged coaxially on or with measurement axes parallel to an oblique measuring axis oriented obliquely to the measuring axis and/or the receiving plane, wherein the camera and the further camera are configured for simultaneously generating the camera image as well as generating the further camera image; and
a transmission interface for transmitting the camera image and the further camera image to an evaluation unit, which is configured to identify the modulation transfer function (MTF) of the afocal optical system by using at least the camera image and/or the further camera image.

2. The measuring apparatus according to claim 1, in which the light-providing device has a focusable or a non-focusable collimator which is configured to provide the light as collimated light.

3. The measuring apparatus according to claim 1, having at least one third camera for observing the optical system in the receiving device from the second side for generating a third camera image and at least one third light-providing device for providing a third light for illuminating the optical system in the receiving device from the first side, wherein, in the operational state of the measuring apparatus, the third light-providing device, the optical system, and the third camera are arranged coaxially on or with measurement axes parallel to a further oblique measuring axis oriented obliquely to the measuring axis and/or the receiving plane and/or the oblique measuring axis.

4. The measuring apparatus according to claim 1, having at least one optical filter which is configured to change light, impinging on the optical filter, with a first wavelength range in order to provide the light with a changed, second wavelength range emerging from the optical filter, and/or which is configured to change light, impinging on the optical filter, with a first polarization in order to provide the light with a changed, second polarization emerging from the optical filter.

5. The measuring apparatus according to claim 1, having a camera holding device which has receiving units for receiving the cameras.

6. The measuring apparatus according to claim 1, having a light-providing holding device which has receiving units for receiving the light-providing devices.

7. The measuring apparatus according to claim 5, in which the camera holding device is arranged so as to be tiltable or tilted relative to a light-providing holding device, or a light-providing holding device is arranged so as to be tiltable or tilted relative to the camera holding device.

8. The measuring apparatus according to claim 5, in which the camera holding device and/or the light-providing holding device is arranged so as to be laterally movable.

9. The measuring apparatus according to claim 1, having a movement device which is configured to move the receiving device transversely to the measuring axis.

10. The measuring apparatus according to claim 1, having at least one aperture for the light and/or the further light.

11. The measuring apparatus according to claim 1, having the evaluation unit, which is configured to identify, using the camera image and/or the further camera image, a deviation in the modulation transfer function (MTF) and to determine, using the deviation, a correction value or a correction matrix for correcting the modulation transfer function (MTF) for increasing the imaging quality of the optical system.

12. The measuring apparatus according to claim 1, in which the camera and/or the further camera has a fixed or adjustable focus position.

13. The measuring apparatus according to claim 1, having a structural detection camera which is arranged to face the second side and configured to detect a predefined structure on the receiving plane or in a defined region around the receiving plane, wherein the evaluation device is configured to determine a lateral position of the optical system by using the detected predefined structure.

14. The measuring apparatus according to claim 1, in which the optical system is formed as an exit window, a display element, a waveguide, an optical filter, a camera lens, or binoculars.

15. A method for measuring a modulation transfer function (MTF) of an afocal optical system, the method comprising:
- providing light for illuminating, using a light-providing device having a broad band light source and a cross shaped test structure illuminated by the broad band light source, the afocal optical system, accommodated in a receiving plane in a receiving device, from a first side;
- providing further light for illuminating, using a further light-providing device having a further broad band light source and a further cross shaped test structure illuminated by the further broad band light source, the afocal optical system, accommodated in the receiving plane in the receiving device, from the first side, wherein the steps of providing light and providing further light are conducted simultaneously;
- generating a camera image of a reticle via the afocal optical system in the receiving device from a second side opposite the first side by using a camera, wherein the light-providing device, the afocal optical system, and the camera are arranged coaxially on or with measurement axes parallel to a measuring axis oriented perpendicularly to the receiving plane;
- generating a further camera image of a further reticle via the afocal optical system in the receiving device from the second side by using a further camera, wherein the further light-providing device, the afocal optical system, and the further camera are arranged coaxially on or with measurement axes parallel to an oblique measuring axis oriented obliquely to the measuring axis and/or the receiving plane, wherein the steps of generating a camera image and generating a further camera image are conducted simultaneously; and
- identifying or calculating, using the camera image and/or the further camera image, the modulation transfer function (MTF) of the afocal optical system.

* * * * *